United States Patent
Paulus et al.

(10) Patent No.: US 11,764,714 B2
(45) Date of Patent: Sep. 19, 2023

(54) METHOD AND DEVICE FOR REGULATING AN ELECTRIC MACHINE

(71) Applicant: Robert Bosch GmbH, Stuttgart (DE)

(72) Inventors: Sebastian Paulus, Esslingen Am Neckar (DE); Michele Hirsch, Esslingen (DE); Wei-Lung Lee, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/780,405

(22) PCT Filed: Oct. 21, 2020

(86) PCT No.: PCT/EP2020/079597
§ 371 (c)(1),
(2) Date: May 26, 2022

(87) PCT Pub. No.: WO2021/104762
PCT Pub. Date: Jun. 3, 2021

(65) Prior Publication Data
US 2023/0006583 A1    Jan. 5, 2023

(30) Foreign Application Priority Data
Nov. 29, 2019 (DE) ................... 10 2019 218 544.4

(51) Int. Cl.
*H02P 21/00* (2016.01)
*H02P 29/50* (2016.01)
*H02P 21/13* (2006.01)

(52) U.S. Cl.
CPC .......... *H02P 21/0017* (2013.01); *H02P 21/13* (2013.01); *H02P 29/50* (2016.02)

(58) Field of Classification Search
CPC ...... H02P 21/0017; H02P 21/13; H02P 29/50; Y02T 10/64
(Continued)

(56) References Cited

U.S. PATENT DOCUMENTS 7,482,777 B2 * 1/2009 Tomigashi ............... H02P 6/18
318/807
8,649,887 B2 * 2/2014 Schulz .................... H02P 11/06
318/400.14

(Continued)

FOREIGN PATENT DOCUMENTS

DE    102017203691 A1    9/2018

OTHER PUBLICATIONS

Translation of International Search Report for Application No. PCT/EP2020/079597 dated Jan. 14, 2021 (2 pages).

*Primary Examiner* — David Luo
(74) *Attorney, Agent, or Firm* — Michael Best & Friedrich LLP

(57) ABSTRACT

The invention relates to a method (400) for regulating an electric machine (190), comprising at least one first filter (140) and at least one second filter (142, 144). The method has the steps of: ascertaining (410) a feedback variable (Idq); filtering (412) a specifiable GW matching variable (Idq*); ascertaining (414) the filtered feedback variable without fundamental components (IdqWo-Funda); filtering (416) the filtered feedback variable without fundamental components (IdqWo-Funda); ascertaining (418) a filtered feedback variable without harmonic components (IdqFunda); and energizing (480) at least one winding of the electric machine (190) on the basis of the filtered feedback variable without harmonic components (IdqFunda).

11 Claims, 7 Drawing Sheets

(58) Field of Classification Search
USPC .............................. 318/400.04, 400.01, 700
See application file for complete search history.

(56) References Cited

U.S. PATENT DOCUMENTS

| | | |
|---|---|---|
| 2002/0097015 A1 | 7/2002 | Kitajima et al. |
| 2006/0038531 A1 | 2/2006 | Wakabayashi et al. |
| 2015/0127202 A1 | 5/2015 | Itou |

* cited by examiner

METHOD AND DEVICE FOR REGULATING AN ELECTRIC MACHINE

BACKGROUND OF THE INVENTION

The invention relates to a method and a device for controlling an electric machine. The invention further relates to an electric drive system having a corresponding device and to a vehicle having an electric drive system and also to a computer program and a computer-readable storage medium.

Document DE 2017 102 036 91 A1 discloses control for an electric machine, in which a disturbance variable is compensated for and a target value is set at the same time. For operation of an electric machine, a phase current is adjusted as the target value. The phase current is preferably adjusted as a sinusoidal fundamental. During operation of the electric machine, the phase current causes a uniform average torque to be output. On account of non-ideal sinusoidal magnetic fields, turn arrangements, slotting, tooth shape, saturation effects and/or other effects, harmonic overtones of the torque are also formed in addition to the uniform average torque. Such effects lead to force waves between the rotor and the stator, these force waves acting as tangential and radial tooth forces on the stator teeth given characteristic orders. Owing to the mechanical transmission behavior of the electric machine, these forces can be perceived as vibrations in the machine, the machine housing and coupled-on elements and therefore as structure-borne and airborne sound or surface vibrations. The harmonic overtones of the torque also cause harmonics of the electrical frequency of the electric machine on the phase current as disturbance variables in this case. In order to minimize these disturbance variables, harmonics are adjusted in a targeted manner and harmonics which are superimposed on the adjusted and specified phase current are specified.

There is a need for alternative methods and devices for controlling an electric machine, with which the harmonics are controlled in as robust and stable a manner as possible with high dynamics and flexibility in respect of taking into account relevant frequency components.

SUMMARY OF THE INVENTION

The invention provides a method for controlling an electric machine having at least one first filter and at least one second filter. The method comprises the steps of:
- ascertaining a feedback variable, the feedback variable comprising an actual variable of a fundamental and of a harmonic of a specified frequency in a field-oriented system;
- filtering a specifiable fundamental DC reference variable by means of the first filter;
- ascertaining the filtered feedback variable without a fundamental component as the difference between the feedback variable and the filtered fundamental DC reference variable;
- filtering the filtered feedback variable without a fundamental component by means of at least one second filter;
- ascertaining the filtered feedback variable without a harmonic component as the addition of the output variable of the at least one second filter and the filtered fundamental DC reference variable;
- energizing at least one winding of the electric machine as a function of the filtered feedback variable without a harmonic component.

Field-oriented control arrangements are widely used for controlling electric machines. In so doing, the AC variables of the, preferably sinusoidal, phase currents to be adjusted in the time domain, also called the fundamentals, are respectively transferred by means of a mathematical transformation into a coordinate system rotating with the frequency of the AC variables. The frequency of the AC variables also determines the frequency of the magnetic field in the machine, and therefore this coordinate system rotating with the frequency of the AC variables is also called a field-oriented system. During stationary operation of the electric machine, the AC variables in the time domain produce DC variables in the field-oriented system, which DC variables can be controlled by means of customary control engineering methods. The field-oriented system is also called a d/q coordinate system. In this case, the d-axis of said d/q coordinate system points in the direction of the rotor flux. The q-axis is perpendicular to the d-axis. A sinusoidal phase current is represented as a stator current phasor or stator current vector, which is characterized by means of its length and its direction. This current phasor rotates synchronously with the rotating stator or rotor flux of the electric machine. In the d/q coordinate system, the current phasor can be represented in accordance with its length and its direction by means of two components Id and Iq which are perpendicular to one another and are DC variables in the stationary case.

In order to control an electric machine which can be connected to the harmonic controller, a feedback variable of the electric machine is detected in the field-oriented system. This feedback variable comprises a fundamental and a superimposed harmonic. In the field-oriented system, the phase current is a DC variable, while the harmonic is an AC variable. A specifiable fundamental DC reference variable is filtered by means of the first filter. Here, the filtered fundamental DC reference variable preferably corresponds to a modeled fundamental component from the closed control loop of the field-oriented control arrangement. A filtered feedback variable without a fundamental component is further ascertained as the difference between the feedback variable and the filtered fundamental DC reference variable. The filtered feedback variable without a fundamental component is filtered by means of at least one second filter. A filtered feedback variable without a harmonic component is ascertained as the addition of the output variable of the at least one second filter and the filtered fundamental DC reference variable. At least one winding of the electric machine is then energized as a function of the feedback variable without a harmonic component.

The feedback variable without a harmonic component for the fundamental controller, which is preferably based on a measured current or phase current of the electric machine, advantageously does not have any or only small components of the harmonics. Therefore, a method for effectively determining a filtered feedback variable without a harmonic component for a fundamental controller is provided.

The formulation that a variable of the control loop comprises a harmonic or fundamental means, within the scope of this application, that a variable of the control loop characterizes or describes at least one harmonic or fundamental, the respective variable of the control loop also being able to contain further signal components, for example a fundamental and one or more harmonics as well as disturbance variables which are additionally still present.

In order to control electric machines, target phase currents are widely specified as a function of ascertained actual phase currents as a function of a torque specification, wherein the phase voltages are set as manipulated variables. Consequently, in scope of this application, the feedback variable (Idq), the DC feedback variable (IHrmc), the DC reference variable (IHrmc*), the machine feedback variable (Iabc) or the specifiable fundamental DC reference variable (Idq*) each preferably comprise a current value and/or the DC manipulated variable (UHrmc*), the manipulated variable (UdqHrmc*), the fundamental DC manipulated variable or the machine manipulated variable (Uabc*) each comprise a voltage value.

The feedback variable in the field-oriented system preferably comprises a fundamental and a harmonic with a positive frequency with a first amplitude and a first phase of a $k^{th}$ order of an electrical frequency of the electric machine and/or a harmonic with a negative frequency with a second amplitude and a second phase of the $k^{th}$ order of an electrical frequency of the electric machine.

The feedback variable in the field-oriented system comprises at least one fundamental and one harmonic. Based on the electrical frequency of the electric machine, the harmonic or the harmonics has/have a positive and/or negative frequency of the $k^{th}$ order with a respective amplitude and phase position. An order which represents a relevant disturbance variable, since in particular the amplitudes thereof are particularly large, is for example the $6^{th}$ order, preferably in the positive and negative direction. For example, in the case of an electrical frequency of the electric machine, that is to say of the fundamental, of 450 Hz in the time domain, the frequency of the $6^{th}$ order given 450 Hz+450 Hz*6=3150 Hz and also in the negative direction given 450 Hz−6*450 Hz=−2250 Hz. In the field-oriented system, the coordinate system of which rotates with the electrical frequency of the electric machine, the electrical frequency of the electric machine is mapped at 0 Hz and the frequencies +2700 Hz and −2700 Hz are produced for the harmonics of the +/−$6^{th}$ order. Force waves between the rotor and the stator of the electric machine, which force waves act as tangential and radial tooth forces on the stator teeth and cause the harmonic overtones of the torque, are produced as a function of the magnitude of the amplitudes and the phase position. The greater the number of relevant orders of the feedback variables taken into account for the control, the more effectively the disturbance variables are compensated for.

In another refinement of the invention, the specifiable fundamental DC reference variable of the field-oriented system comprises a target variable for generating the fundamental of a sinusoidal phase current for energizing at least one winding of the electric machine.

The fundamental DC reference variable is a target value for generating a fundamental with the electrical frequency of the electric machine for energizing the electric machine. This target value is specified analytically or by means of a characteristic map in particular as a function of a torque specification, a (phase) current target value or an actual current value, preferably an ascertained phase current. It is already specified in an appropriately transformed manner for use in a fundamental controller in the field-oriented system.

A fundamental DC reference variable is advantageously provided for determining a feedback variable without a harmonic component for a fundamental controller.

In another refinement of the invention, filtering the filtered feedback variable without a fundamental component by means of at least one second filter comprises notch filtering the filtered feedback variable without a fundamental component.

By means of notch filtering, harmonic components are removed from the difference between the feedback variable and the filtered fundamental DC reference variable in a targeted manner. Several notch filters are preferably used in succession or connected one behind the other for the purpose of filtering the harmonic components of positive and negative frequencies and/or different orders. The coefficients of the notch filters are preferably multiplied for the purpose of providing a filter with several stopbands. The notch filters are ideally of digital design in the form of IIR filters.

An effective method for removing the harmonic component of specifiable orders of the harmonics for the filtered feedback variable without a harmonic component is advantageously provided.

In another refinement of the invention, filtering the specifiable fundamental DC reference variable by means of the first filter comprises low-pass filtering the fundamental DC reference variable.

An effective method for removing the fundamental component of the fundamental DC reference variable based on the fundamental DC reference variable is advantageously provided.

In another refinement of the invention, the filter time constant of the filter corresponds to the bandwidth of the field-oriented system or to the bandwidth of the closed field-oriented control loop.

The filter time constant is specified as being equal to or dependent on the transient response time of the closed control loop of the field-oriented control arrangement.

A possible way of modeling the course of the fundamental DC feedback variable based on the fundamental DC reference variable is advantageously provided.

In another refinement of the method for controlling an electric machine, said electric machine further comprises a fundamental controller, the fundamental controller comprising a fundamental input transformer, a fundamental controller and a fundamental output transformer. The method comprises the further steps of:
  ascertaining a machine feedback variable, the machine feedback variable comprising an actual variable of the electric machine;
  transforming the machine feedback variable by means of the fundamental input transformer to form the feedback variable in the field-oriented system;
  ascertaining the fundamental control deviation as the difference between the specified fundamental DC reference variable and the filtered feedback variable without a harmonic component in the field-oriented system;
  ascertaining a fundamental DC manipulated variable by means of the fundamental controller as a function of the fundamental control deviation;
  back-transforming the fundamental DC manipulated variable by means of the fundamental output transformer to form a machine manipulated variable, and
  energizing at least one winding of the electric machine as a function of the machine manipulated variable.

The AC variables of the, preferably sinusoidal, phase currents to be adjusted in the time domain are controlled by means of the fundamental control arrangement. In order to control an electric machine which can be connected to the fundamental controller, a machine feedback variable, an actual variable, of the electric machine is detected in the time domain. The machine feedback variables are preferably the phase currents with superimposed disturbance variables of an electric machine. This machine feedback variable comprises the phase current as the fundamental and harmonics, which are superimposed on the phase current by the electric machine, as disturbance variables. In the time domain, the phase current is an AC variable which is superimposed with further AC variables of the harmonics. In order to control the fundamental, a transformation from the time domain into the field-oriented range is performed. For this purpose, the machine feedback variable is transformed by means of a fundamental input transformer to form the feedback variable in the field-oriented system. Within the scope of this application, "fundamental" as an identifier preferably stands for the control steps and transformations which are used for controlling the fundamental. During stationary operation of the electric machine, AC variables in the time domain produce DC variables in the field-oriented system. These DC variables can be controlled by means of customary control engineering methods. Accordingly, a fundamental control deviation is ascertained as the difference between the specified fundamental DC reference variable and the filtered feedback variable without a harmonic component in the field-oriented system. A fundamental DC manipulated variable is ascertained by means of a fundamental controller as a function of the fundamental control deviation. For further use for driving or energizing the electric machine in the time domain, the fundamental DC manipulated variable in the field-oriented system is back-transformed by means of the fundamental output transformer to form a machine manipulated variable in the time domain. In the time domain, the machine manipulated variable comprises an AC variable, a fundamental. Finally, the method comprises a step for energizing the electric machine as a function of the machine manipulated variable.

A method for an effective fundamental controller is advantageously provided.

In another refinement of the method for controlling an electric machine, said electric machine further comprises a harmonic controller, the harmonic controller having an input transformer, a controller and an output transformer. The method comprises the following further steps:

transforming the filtered feedback variable without a fundamental component by means of the input transformer to form a DC feedback variable in a harmonic-oriented system;

ascertaining a control deviation as the difference between a specifiable DC reference variable and the DC feedback variable in the harmonic-oriented system;

ascertaining a DC manipulated variable by means of the controller as a function of the control deviation;

back-transforming the DC manipulated variable by means of the output transformer to form a manipulated variable in the field-oriented system;

superimposing the fundamental DC manipulated variable with the manipulated variable, wherein, in the step of back-transforming by means of the fundamental output transformer to form a machine manipulated variable, the output value of the superimposition of the fundamental DC manipulated variable with the manipulated variable is back-transformed to form the machine manipulated variable.

A specifiable fundamental DC reference variable is filtered by means of the first filter. Here, the filtered fundamental DC reference variable preferably corresponds to a modeled fundamental component from the closed control loop of the field-oriented control arrangement. A filtered feedback variable without a fundamental component is ascertained as the difference between the feedback variable and the filtered fundamental DC reference variable. For use of the feedback variable without a fundamental component in a harmonic controller, the feedback variable without a fundamental component is transformed by means of the input transformer to form a DC feedback variable in a harmonic-oriented system.

For controlling a harmonic in a harmonic controller, similarly to the transformation from the time domain into the field-oriented range, the input transformer performs a mathematical transformation with a frequency of the harmonic from the field-oriented system into a harmonic-oriented system. For this purpose, the feedback variable without a fundamental component is transformed by means of an input transformer to form a DC feedback variable in the harmonic-oriented system. Variables which are represented as AC variables in the field-oriented system are represented as DC variables in the harmonic-oriented system during stationary operation of the electric machine. These DC variables can be controlled by means of customary control engineering methods.

The transformation from the field-oriented system into the harmonic-oriented system comprises rotation by means of a rotation matrix. An AC variable in the field-oriented system therefore becomes a DC variable in the harmonic-oriented system. For this purpose, the feedback variable is rotated with a rotation angle which corresponds to k times the current rotor angle, that is to say with 6 times the current rotor angle in the case of the transformation of the harmonic of the $6^{th}$ order of the electrical frequency. For the harmonics of the $k^{th}$ order in the positive direction, the rotation takes place in the positive direction; in the case of the harmonics of the $k^{th}$ order in the negative direction, the rotation takes place in the negative direction. The resulting DC variables in the harmonic-oriented system can be indicated, characterized or described by means of complex numbers or as complex parameters, for example as iPosReal, iPosImag and, respectively, as iNegReal and iNegImag.

In addition to the rotation, other transformations can also be used, as an alternative. For example, the complex components iDSin, IDCos can also be calculated by multiplication of the d-current by the sine depending on k times the rotor angle and also by the cosine, and the complex components iQSin, IQCos can be calculated by multiplication of the q-current by the sine and also by the cosine (also called frequency mixing or heterodyning).

Complex harmonics with an amplitude and phase respectively of the d-current and q-current can be used as a further alternative description.

Equally, the components can also be represented as an ellipse with a height, width, rotation and phase by superimposition of two oppositely rotating phasors with a different amplitude and phase, preferably for particularly efficient calibration.

Furthermore, a control deviation is ascertained as the difference between a specifiable DC reference variable and the DC feedback variable in the harmonic-oriented system. A DC manipulated variable is ascertained by means of a controller as a function of the control deviation. For further use in the field-oriented control of the electric machine, this DC manipulated variable as the DC variable in the harmonic-oriented system is back-transformed by means of the output transformer to form a manipulated variable in the field-oriented system. In the field-oriented system, the manipulated variable comprises an AC variable, a harmonic.

The specifiable DC reference variable of the harmonic-oriented system preferably comprises a target variable in the harmonic-oriented system for generating a harmonic on a sinusoidal phase current for energizing at least one winding of the electric machine.

The DC reference variable is a target value for generating a harmonic of a specifiable frequency or $k^{th}$ order of the electrical frequency of the electric machine for superimposition on the sinusoidal phase current or the fundamental for energizing the electric machine. This target value is specified analytically or by means of a characteristic map in particular as a function of a torque specification, a (phase) current target value or an actual current value, preferably an ascertained phase current. It is already specified in an appropriately transformed manner for use in the harmonic controller in the harmonic-oriented system.

The DC manipulated variable is preferably back-transformed as a function of an ascertained current rotor angle of the electric machine. The back-transformation comprises rotation with a rotation angle which corresponds to k times the current rotor angle. The back-transformation comprises rotation respectively in the positive and/or negative opposite direction to the rotation of the feedback variable by means of the input transformer. The transformation from the harmonic-oriented system into the field-oriented system comprises rotation by means of a rotation matrix. A DC variable in the harmonic-oriented system therefore becomes an AC variable in the field-oriented system. For this purpose, the DC manipulated variable is rotated with a rotation angle which corresponds to k times the current rotor angle, that is to say with 6 times the current rotor angle in the case of the transformation of the harmonic of the $6^{th}$ order of the electrical frequency. For the harmonics of the $k^{th}$ order in the positive direction, the rotation takes place in the positive direction; in the case of the harmonics of the $k^{th}$ order in the negative direction, the rotation takes place in the negative direction. This results in AC variables in the field-oriented system. In the case of rotation in the negative and positive direction, the resulting AC variables in the field-oriented system are preferably added in a complex manner to the manipulated variable.

Furthermore, the manipulated variable as the output signal of the harmonic controller is superimposed with or has added to it the fundamental DC manipulated variable in the field-oriented system. For further use for driving or energizing the electric machine in the time domain, this output variable of the superimposition in the field-oriented system is back-transformed by means of the fundamental output transformer to form a machine manipulated variable in the time domain. In the time domain, the machine manipulated variable comprises an AC variable, a fundamental, and at least one further superimposed AC variable, a harmonic. Finally, the method comprises a step for energizing the electric machine as a function of the machine manipulated variable.

A method for an effective fundamental and harmonic controller is advantageously provided.

The invention further relates to a computer program which comprises commands which, when executed by a computer, cause said computer to execute the steps of the method described above.

The invention further relates to a computer-readable storage medium, comprising commands which, when executed by a computer, cause said computer to execute the steps of the method described above.

The invention further relates to a device for controlling an electric machine, comprising a computer unit and at least one first filter and one second filter. The device is designed to execute the steps of the method described.

A device for effectively determining a filtered feedback variable without a harmonic component for a fundamental controller is advantageously provided.

In another refinement of the invention, the device comprises a fundamental controller, the fundamental controller comprising a fundamental input transformer, a fundamental controller and a fundamental output transformer. The device is designed to execute the steps of the method described.

A device for effective harmonic control of an electric machine is advantageously provided.

In another refinement of the invention, the device comprises a harmonic controller, the harmonic controller comprising an input transformer, a controller and an output transformer. The device is designed to execute the steps of the method described.

A device for effective, combined fundamental and harmonic control of an electric machine is advantageously provided.

The invention further relates to an electric drive system comprising an electric machine and a device as described. An electric drive system of this kind serves, for example, to drive an electric vehicle. Optimized operation of the drive train is rendered possible by means of the method and the device.

The invention further relates to a vehicle comprising a drive system as described. Therefore, a vehicle which comprises a device with which an electric machine is effectively controlled is advantageously provided.

It goes without saying that the features, properties and advantages of the method according to the invention relate and/or can be applied accordingly to the device and, respectively, the drive system and the vehicle, and vice versa.

BRIEF DESCRIPTION OF THE DRAWINGS

Further features and advantages of embodiments of the invention can be found in the following description with reference to the appended drawings.

In the following text, the invention is to be described in greater detail on the basis of some figures, in which.

DETAILED DESCRIPTION

Figure 1:
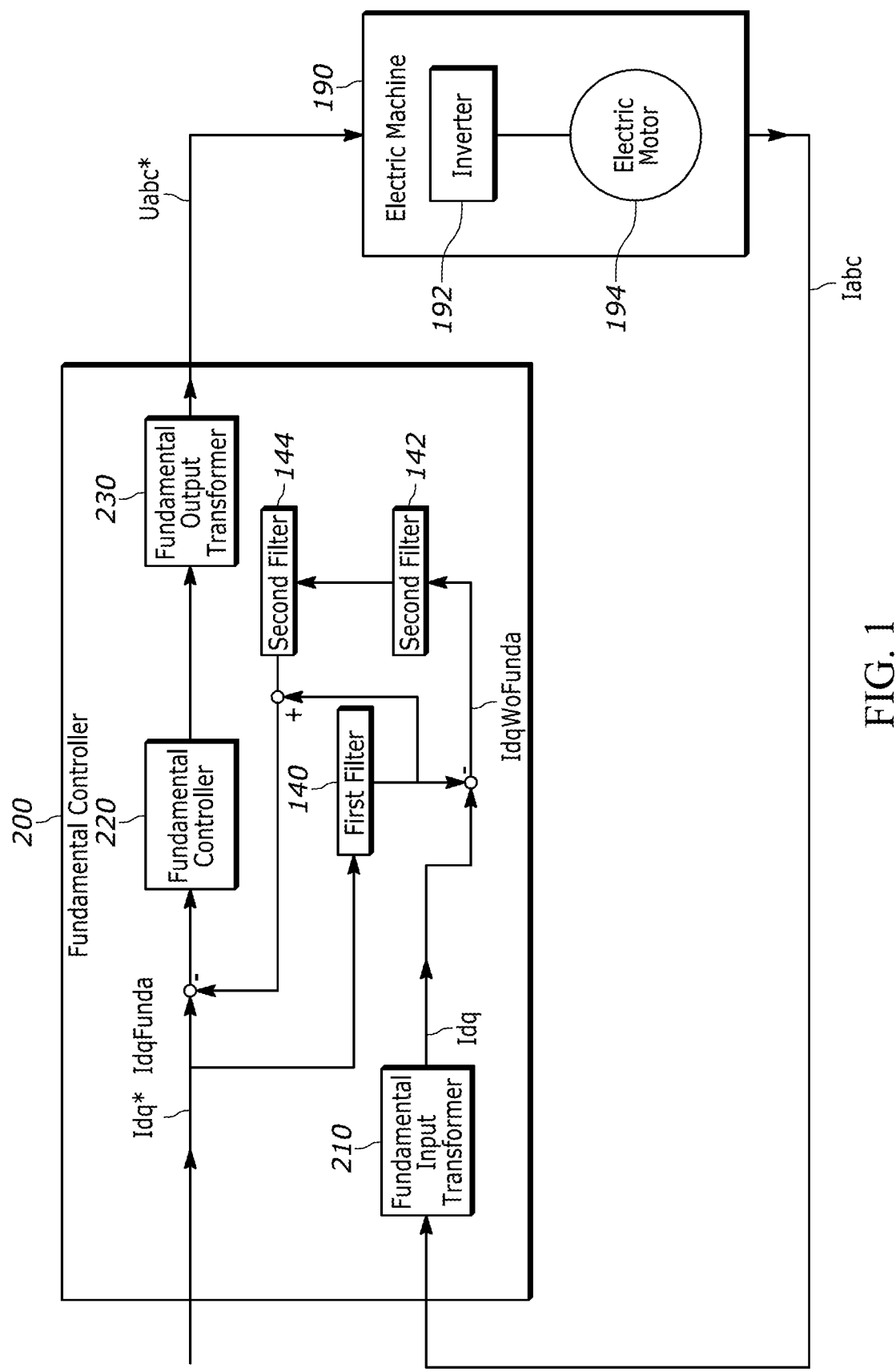
FIG. 1 shows a diagrammatic control structure for controlling an electric machine

FIG. 1 shows a diagrammatic control structure for controlling an electric machine 190. The electric machine 190 is illustrated as a unit comprising an inverter 192 and an electric motor 194. The fundamental controller 200 comprises a fundamental input transformer 210, a fundamental controller 220 and a fundamental output transformer 230. The control structure further comprises a first filter 140 and second filters 142 and 144. A machine feedback variable Iabc of the electric machine is ascertained in the time domain and supplied to the fundamental input transformer 210. The machine feedback variable Iabc is transformed by means of the fundamental input transformer 210 to form the feedback variable Idq in the field-oriented system. A specifiable fundamental DC reference variable Idq* is filtered by means of the first filter 140. A filtered feedback variable without a fundamental component IdqWoFunda is ascertained as the difference between the feedback variable Idq and the filtered fundamental DC reference variable Idq*, the filtered feedback variable without a fundamental component being filtered by means of at least one second filter 142, 144. The filtered feedback variable without a harmonic component IdqFunda is ascertained as the addition of the output variable of the at least one second filter 142, 144 and the filtered fundamental DC reference variable Idq*. The fundamental control deviation is ascertained as the difference between the specified fundamental DC reference variable Idq* and the filtered feedback variable without a harmonic component IdqFunda in the field-oriented system. A fundamental DC manipulated variable is ascertained by means of the fundamental controller 220 as a function of the fundamental control deviation. The fundamental DC manipulated variable is transformed by means of the fundamental output transformer 230 to form a machine manipulated variable Uabc* in the time domain. For the purpose of energizing at least one winding of the electric machine 190, the machine manipulated variable Uabc*, preferably a phase voltage, is supplied to said winding. The phase voltage is generated by means of the inverter 192 and applied at least to one winding of the electric motor 194.

Figure 2:
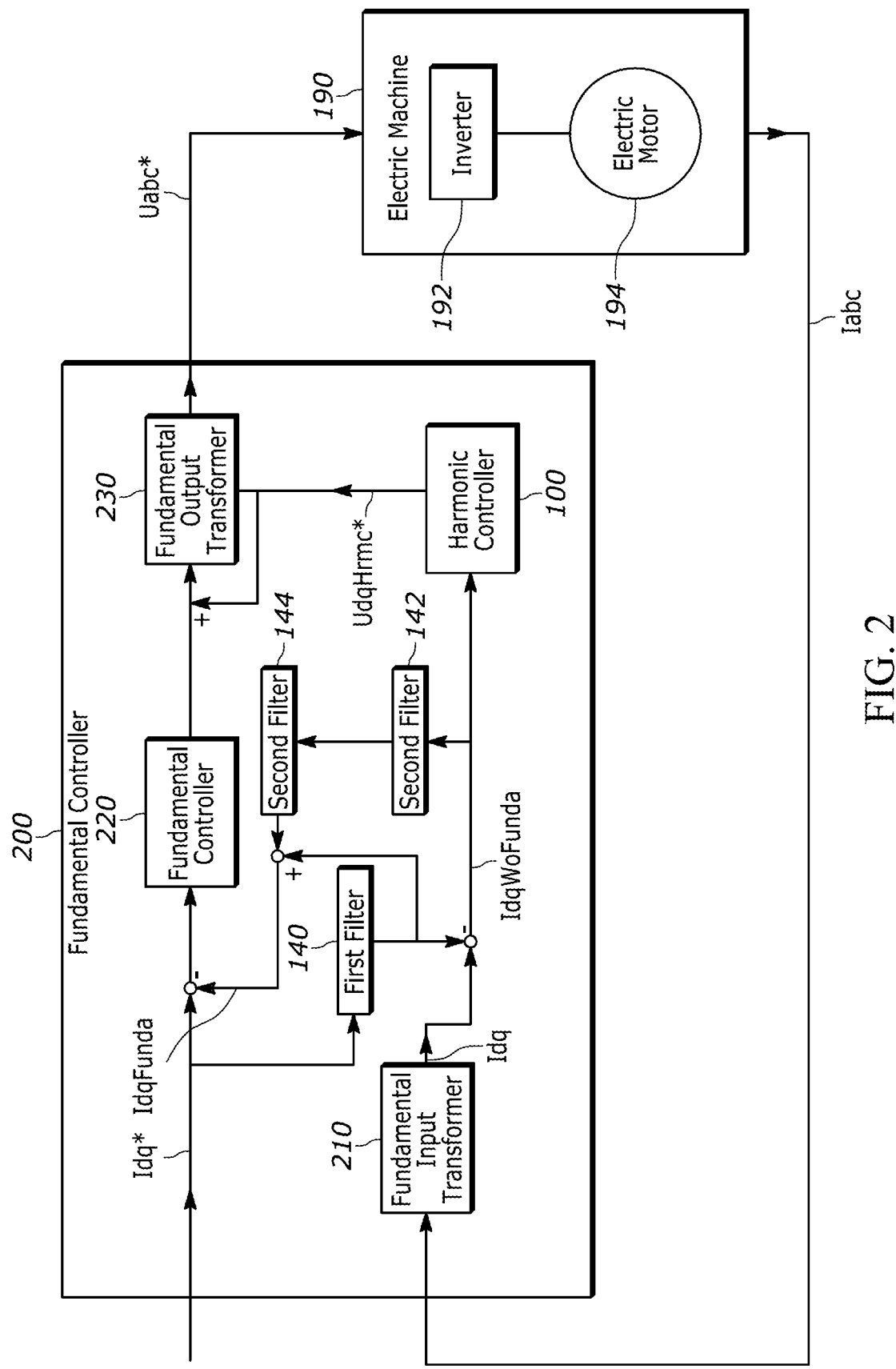
FIG. 2 shows a diagrammatic control structure for controlling an electric machine having a harmonic controller

FIG. 2 shows a schematic control structure for controlling an electric machine having a harmonic controller 100. In contrast to FIG. 1, the harmonic controller ascertains the manipulated variable UdqHrmc* as a function of the filtered feedback variable without a fundamental component IdqWoFunda. In this case, the fundamental DC manipulated variable ascertained in parallel is superimposed with the manipulated variable UdqHrmc*. The output variable of the superimposition in the field-oriented system is transformed by means of the fundamental output transformer 230 to form a machine manipulated variable Uabc* in the time domain. For the purpose of energizing at least one winding of the electric machine 190, the machine manipulated variable Uabc*, preferably a phase voltage, is supplied to said winding. The phase voltage is generated by means of the inverter 192 and applied at least to one winding of the electric motor 194.

Figure 3:
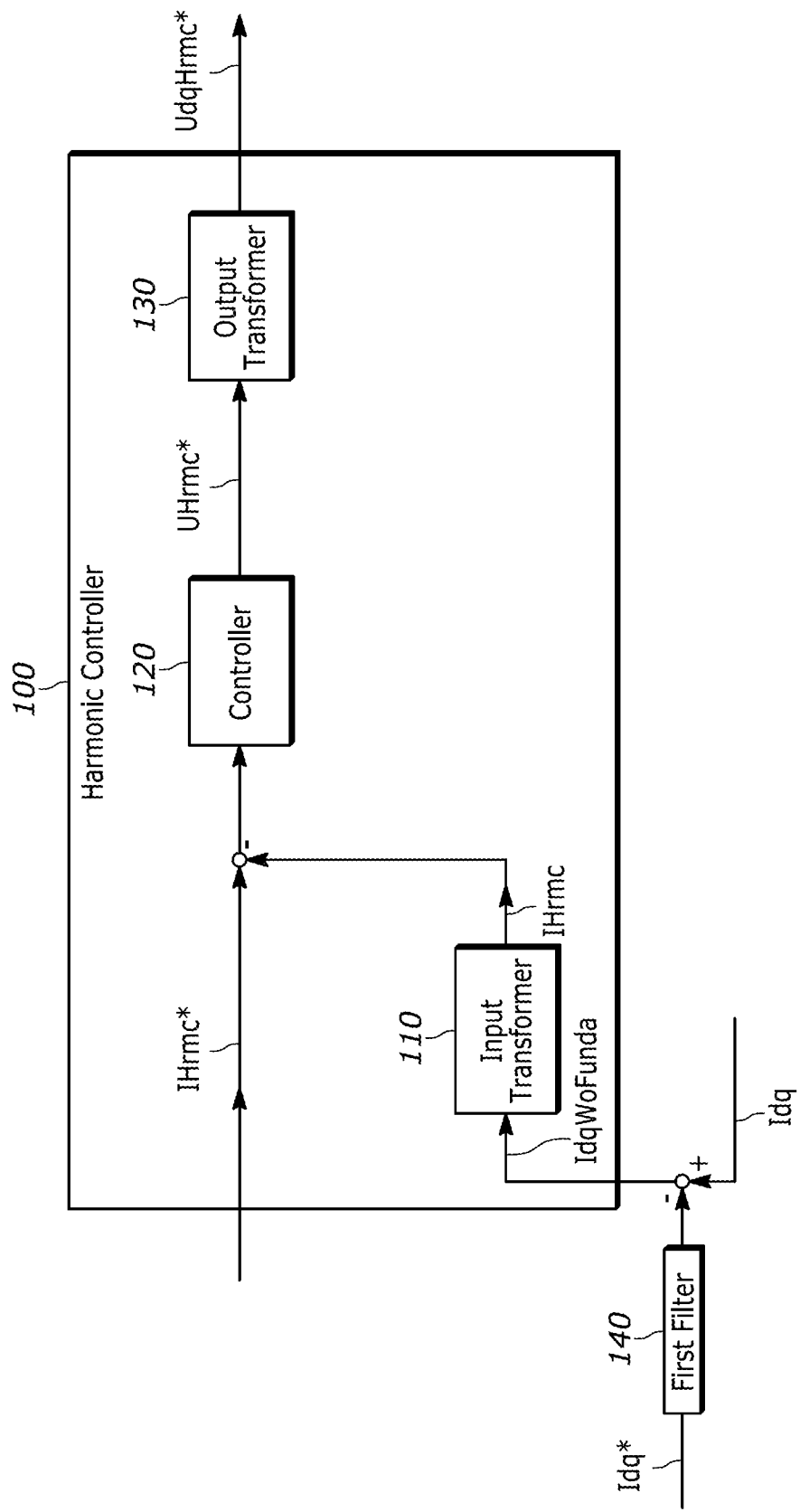
FIG. 3 shows a schematic control structure of a harmonic controller

FIG. 3 shows a diagrammatic control structure of a harmonic controller 100 having a filter 140. The harmonic controller 100 comprises an input transformer 110. A specifiable fundamental DC reference variable Idq* is filtered, preferably low-pass-filtered, by means of the filter 140. Furthermore, a feedback variable Idq is ascertained in a field-oriented system. The filtered feedback variable without a fundamental component IdqWoFunda is ascertained as the difference between the feedback variable Idq and the filtered fundamental DC reference variable Idq*. This filtered feedback variable without a fundamental component IdqWoFunda is transformed by means of the input transformer 110 to form a DC feedback variable IHrmc in a harmonic-oriented system. The harmonic controller 100 further comprises a controller 120 and an output transformer 130. An ascertained difference between a specifiable DC reference variable IHrmc* and the DC feedback variable IHrmc in the harmonic-oriented system is supplied to the controller 120 as the control deviation and the input variable. A DC manipulated variable UHrmc* is ascertained by means of the controller 120 as a function of the control deviation. This DC manipulated variable UHrmc* in the harmonic-oriented system is transformed by means of the output transformer to form a manipulated variable UdqHrmc* in the field-oriented system. At least one winding of an electric machine 190 is preferably energized as a function of the manipulated variable UdqHrmc*.

Figure 4:
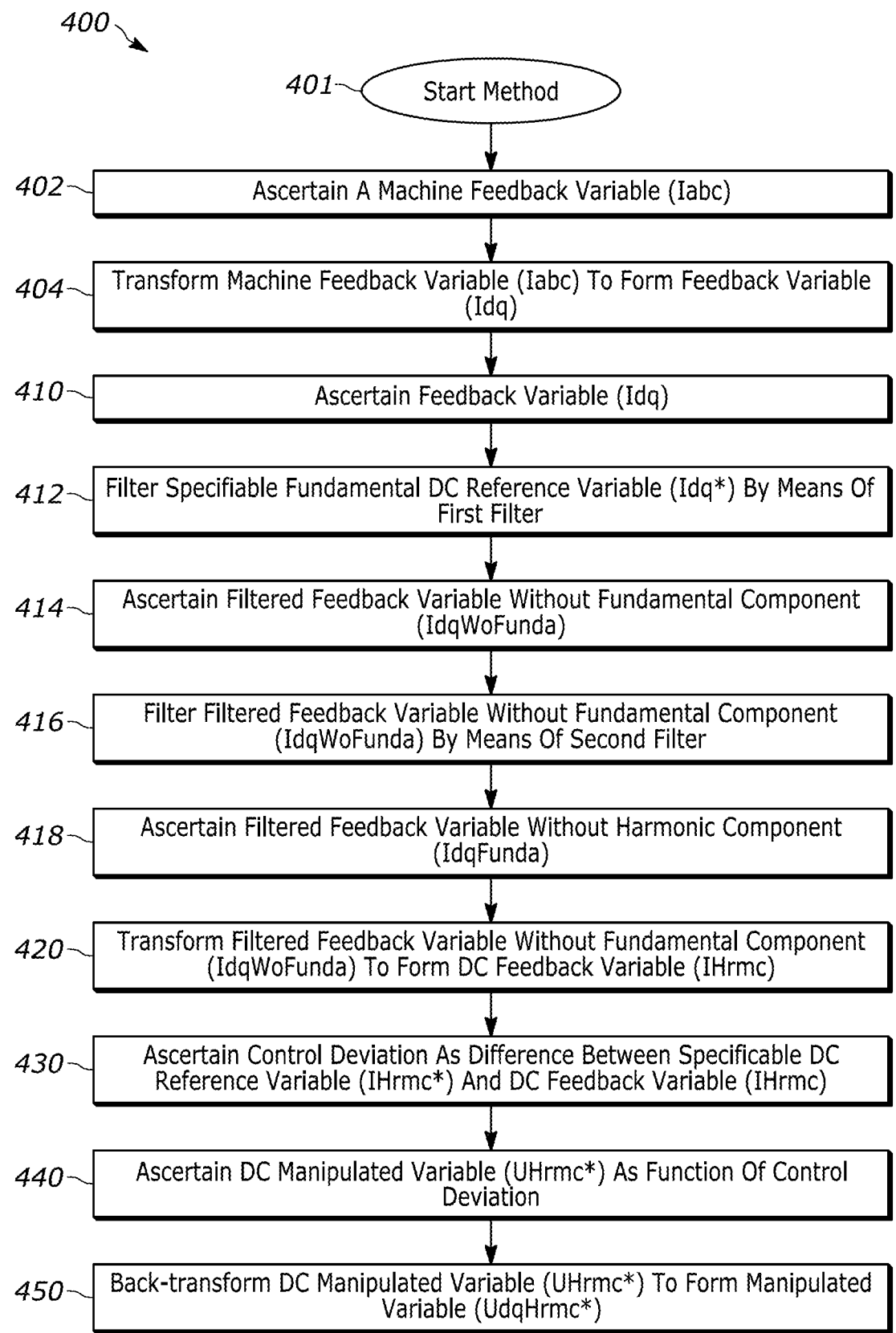
FIG. 4 shows a diagrammatically illustrated flowchart for a method for controlling an electric machine
Figure 4:
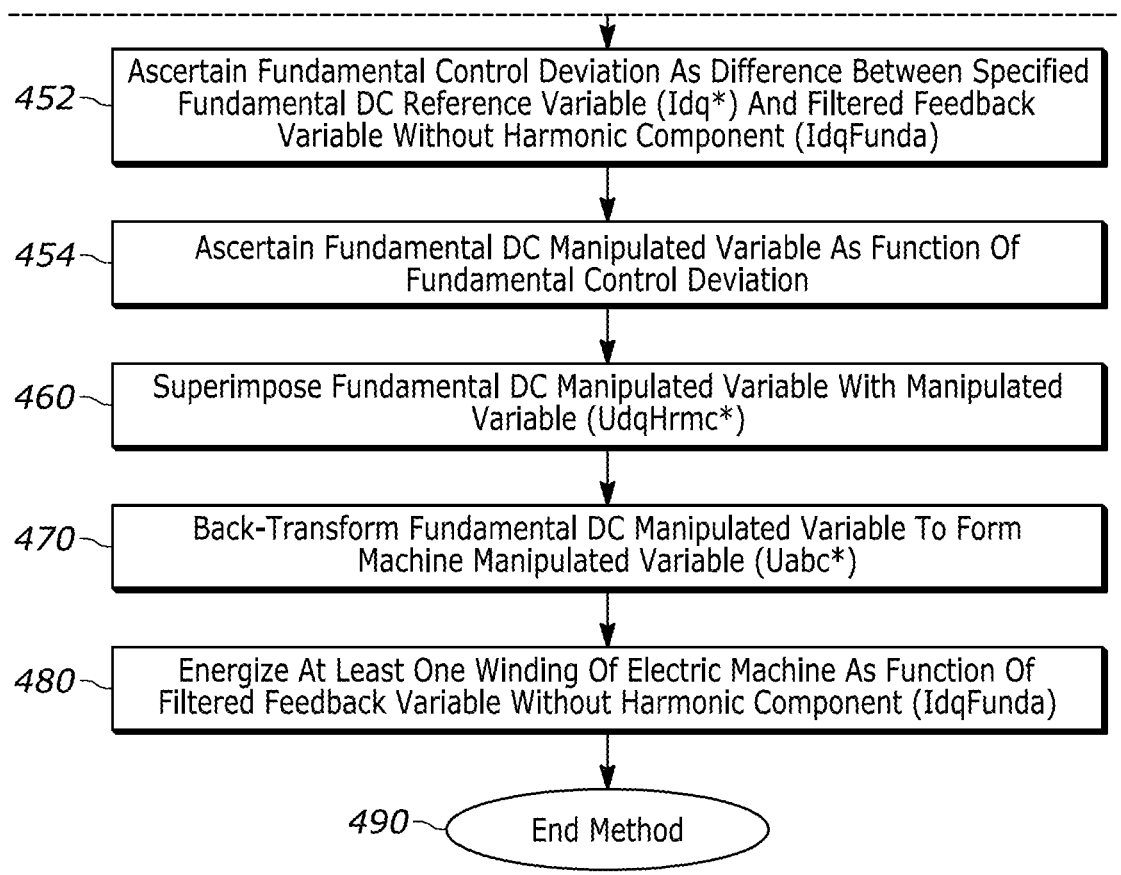

FIG. 4 shows a diagrammatically illustrated flowchart of a method 400 for controlling an electric machine 190. The method starts with step 401. In step 402, a machine feedback variable Iabc of the electric machine is preferably ascertained in the time domain. In step 404, this machine feedback variable Iabc is preferably transformed by means of the fundamental input transformer 210 to form the feedback variable Idq in the field-oriented system.

In step 410, a feedback variable Idq is ascertained. In step 412, a specifiable fundamental DC reference variable Idq* is filtered by means of the first filter 140. In step 414, the filtered feedback variable without a fundamental component IdqWoFunda is ascertained as the difference between the feedback variable Idq and the filtered fundamental DC reference variable Idq*. In step 416, the filtered feedback variable without a fundamental component IdqWoFunda is filtered by means of a second filter 142, 144. In step 418, a filtered feedback variable without a harmonic component IdqFunda is ascertained as the addition of the output variable of the at least one second filter 142, 144 and the filtered fundamental DC reference variable Idq*. In step 480, at least one winding of the electric machine 190 is preferably energized as a function of the filtered feedback variable without a harmonic component IdqFunda.

In step 420, the filtered feedback variable without a fundamental component IdqWoFunda is preferably transformed by means of the input transformer 110 to form a DC feedback variable IHrmc in a harmonic-oriented system. In step 430, a difference between a specifiable DC reference variable IHrmc* and the DC feedback variable IHrmc is supplied to the controller 120 as the control deviation and the input variable. In step 440, a DC manipulated variable UHrmc* is ascertained by means of the controller as a function of the control deviation. In step 450, this DC manipulated variable UHrmc* in the harmonic-oriented system is transformed by means of the output transformer to form a manipulated variable UdqHrmc* in the field-oriented system. In step 452, a fundamental control deviation is preferably ascertained as the difference between the specified fundamental DC reference variable Idq* and the filtered feedback variable without a harmonic component IdqFunda in the field-oriented system. In step 454, a fundamental DC manipulated variable is preferably ascertained by means of the fundamental controller 220 as a function of the fundamental control deviation. In step 460, the fundamental DC manipulated variable is preferably superimposed with the manipulated variable UdqHrmc*. In step 470, the output variable of the superimposition in the field-oriented system is preferably transformed by means of the fundamental output transformer 230 to form a machine manipulated variable Uabc* in the time domain. In step 480, at least one winding of the electric machine 190 is preferably energized as a function of the machine manipulated variable Uabc*. The method ends with step 490.

Figure 5:
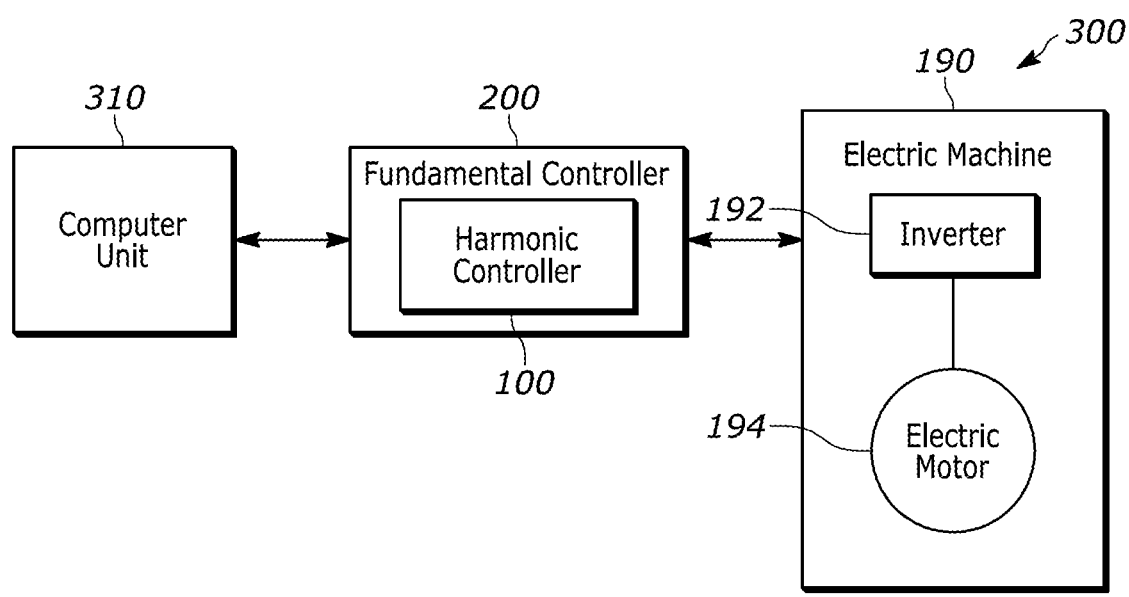
FIG. 5 shows a diagrammatically illustrated device for controlling an electric machine

FIG. 5 shows a diagrammatically illustrated device 300 for controlling an electric machine 190. The electric machine 190 is illustrated as a unit comprising an inverter 192 and an electric motor 194. The device 300 comprises a harmonic controller 100 and a computer unit 310 for controlling and implementing the structure of the harmonic controller 100. The device preferably comprises a fundamental controller 200, which is likewise controlled and implemented by means of the computer unit 310. The device is designed to execute the above-described method steps and therefore to operate and to control the electric machine 190.

Figure 6:
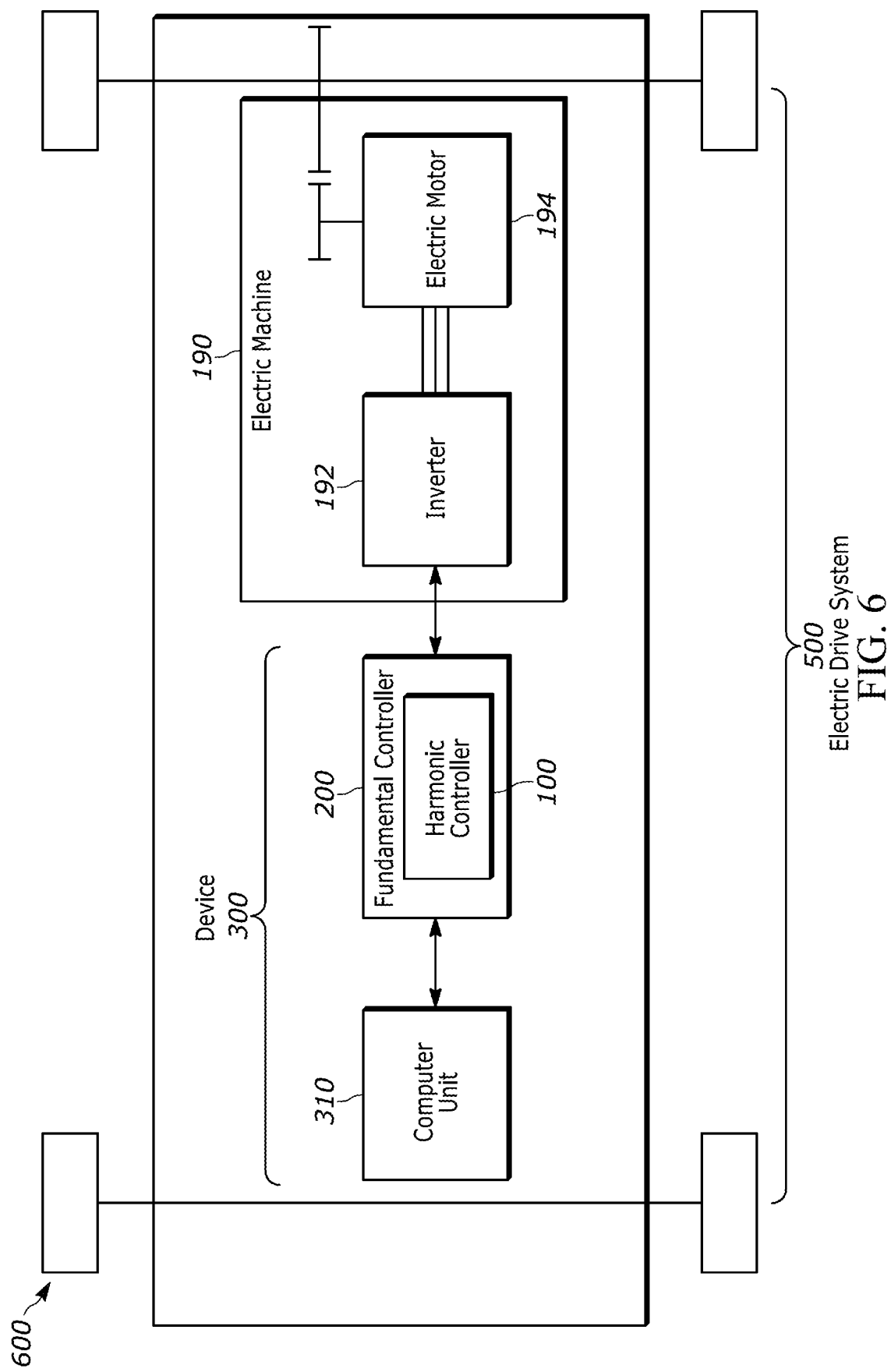
FIG. 6 shows a diagrammatically illustrated vehicle comprising an electric drive system

FIG. 6 shows a diagrammatically illustrated vehicle 600 which comprises an electric drive system 500. The drive system 500 comprises the electric machine 190, which comprises an inverter 192 and an electric motor 194, and a device 300 for controlling the electric machine, as described in relation to FIG. 5. The electric drive system preferably comprises a battery for supplying electrical power to the electric drive system 500.

The invention claimed is:

1. A method (400) for controlling an electric machine (190)
having at least one first filter (140) and at least one second filter (142, 144), comprising the steps of:
ascertaining (410) a feedback variable (Idq), the feedback variable comprising an actual variable of a fundamental and of a harmonic of a specified frequency in a field-oriented system;
filtering (412) a specifiable fundamental DC reference variable (Idq*) by means of the first filter (140);
ascertaining (414) the filtered feedback variable without a fundamental component (IdqWoFunda) as the difference between the feedback variable (Idq) and the filtered fundamental DC reference variable (Idq*);
filtering (416) the filtered feedback variable without a fundamental component (IdqWoFunda) by means of at least one second filter (142, 144);
ascertaining (418) a filtered feedback variable without a harmonic component (IdqFunda) as the addition of the output variable of the at least one second filter (142, 144) and the filtered fundamental DC reference variable (Idq*); and
energizing (480) at least one winding of the electric machine (190) as a function of the filtered feedback variable without a harmonic component (IdqFunda).

2. The method as claimed in claim 1, wherein
the specifiable fundamental DC reference variable (Idq*) of the field-oriented system comprises a target variable for generating the fundamental of a sinusoidal phase current for energizing at least one winding of the electric machine (190).

3. The method as claimed in claim 1, wherein
filtering (416) the filtered feedback variable without a fundamental component (IdqWoFunda) by means of at least one second filter (142, 144) comprises notch filtering the filtered feedback variable without a fundamental component (IdqWoFunda).

4. The method as claimed in claim 1, wherein
filtering the specifiable fundamental DC reference variable (Idq*) by means of the first filter (140) comprises low-pass filtering the fundamental DC reference variable (Idq*).

5. The method as claimed in claim 1, wherein
the filter time constant of the filter (140) corresponds to the bandwidth of the field-oriented system.

6. A method for controlling an electric machine,
having a fundamental controller (200),
the fundamental controller (200) comprising a fundamental input transformer (210), a fundamental controller (220) and a fundamental output transformer (230),
comprising the steps of:
ascertaining (402) a machine feedback variable (Iabc), the machine feedback variable comprising an actual variable of the electric machine;
transforming (404) the machine feedback variable (Iabc) by means of the fundamental input transformer (210) to form the feedback variable (Idq) in the field-oriented system;
ascertaining (452) the fundamental control deviation as the difference between the specified fundamental DC reference variable (Idq*) and the filtered feedback variable without a harmonic component (IdqFunda) in the field-oriented system;
ascertaining (454) a fundamental DC manipulated variable by means of the fundamental controller (220) as a function of the fundamental control deviation; and
back-transforming (470) the fundamental DC manipulated variable by means of the fundamental output transformer (230) to form a machine manipulated variable (Uabc*), and energizing (480) at least one winding of the electric machine (190) as a function of the machine manipulated variable (Uabc*).

7. The method (400) as claimed in claim 6 for controlling an electric machine,
having a harmonic controller (100),
the harmonic controller comprising an input transformer (110), a controller (120) and an output transformer (130),
comprising the steps of:
transforming (420) the filtered feedback variable without a fundamental component (IdqWoFunda) by means of the input transformer to form a DC feedback variable (IHrmc) in a harmonic-oriented system;
ascertaining (430) the control deviation as the difference between a specifiable DC reference variable (IHrmc*) and the DC feedback variable (IHrmc) in the harmonic-oriented system;
ascertaining (440) a DC manipulated variable (UHrmc*) by means of the controller (120) as a function of the control deviation;
back-transforming (450) the DC manipulated variable (UHrmc*) by means of the output transformer to form a manipulated variable (UdqHrmc*) in the field-oriented system; superimposing (460) the fundamental DC manipulated variable with the manipulated variable (UdqHrmc*),
wherein, in the step of back-transforming (470) by means of the fundamental output transformer (230) to form a machine manipulated variable (Uabc*), the output value of the superimposition (460) of the fundamental DC manipulated variable with the manipulated variable (UdqHrmc*) is back-transformed to form the machine manipulated variable (Uabc*).

8. A non-transitory, computer-readable medium, comprising commands which, when executed by a computer, cause the computer to control an electric machine (190) that includes at least one first filter (140) and at least one second filter (142, 144), by:
ascertaining (410) a feedback variable (Idq), the feedback variable comprising an actual variable of a fundamental and of a harmonic of a specified frequency in a field-oriented system;
filtering (412) a specifiable fundamental DC reference variable (Idq*) by means of the first filter (140);
ascertaining (414) the filtered feedback variable without a fundamental component (IdqWoFunda) as the difference between the feedback variable (Idq) and the filtered fundamental DC reference variable (Idq*);
filtering (416) the filtered feedback variable without a fundamental component (IdqWoFunda) by means of at least one second filter (142, 144);
ascertaining (418) a filtered feedback variable without a harmonic component (IdqFunda) as the addition of the output variable of the at least one second filter (142, 144) and the filtered fundamental DC reference variable (Idq*); and energizing (480) at least one winding of the electric machine (190) as a function of the filtered feedback variable without a harmonic component (IdqFunda).

9. A device (300) for controlling an electric machine (190), comprising a computer unit (310) and at least one first filter (140) and one second filter (142, 144),
wherein the device is configured to
ascertain (410) a feedback variable (Idq), the feedback variable comprising an actual variable of a fundamental and of a harmonic of a specified frequency in a field-oriented system;
filter (412) a specifiable fundamental DC reference variable (Idq*) by means of the first filter (140);
ascertain (414) the filtered feedback variable without a fundamental component (IdqWoFunda) as the difference between the feedback variable (Idq) and the filtered fundamental DC reference variable (Idq*);
filter (416) the filtered feedback variable without a fundamental component (IdqWoFunda) by means of at least one second filter (142, 144);
ascertain (418) a filtered feedback variable without a harmonic component (IdqFunda) as the addition of the output variable of the at least one second filter (142, 144) and the filtered fundamental DC reference variable (Idq*); and
energize (480) at least one winding of the electric machine (190) as a function of the filtered feedback variable without a harmonic component (IdqFunda).

10. The device (300) as claimed in claim 9,
comprising a fundamental controller (200),
the fundamental controller comprising a fundamental input transformer (210), a fundamental controller (220) and a fundamental output transformer (230),
wherein the device is configured to
ascertain (402) a machine feedback variable (Iabc), the machine feedback variable comprising an actual variable of the electric machine;
transform (404) the machine feedback variable (Iabc) by means of the fundamental input transformer (210) to form the feedback variable (Idq) in the field-oriented system;
ascertain (452) the fundamental control deviation as the difference between the specified fundamental DC reference variable (Idq*) and the filtered feedback variable without a harmonic component (IdqFunda) in the field-oriented system;
ascertain (454) a fundamental DC manipulated variable by means of the fundamental controller (220) as a function of the fundamental control deviation; and
back-transform (470) the fundamental DC manipulated variable by means of the fundamental output transformer (230) to form a machine manipulated variable (Uabc*), and energizing (480) at least one winding of the electric machine (190) as a function of the machine manipulated variable (Uabc*).

11. The device (300) as claimed in claim 10,
comprising a harmonic controller (100),
the harmonic controller comprising an input transformer (110), a controller (120) and an output transformer (130),
wherein the device is configured to
transform (420) the filtered feedback variable without a fundamental component (IdqWoFunda) by means of the input transformer to form a DC feedback variable (IHrmc) in a harmonic-oriented system;
ascertain (430) the control deviation as the difference between a specifiable DC reference variable (IHrmc*) and the DC feedback variable (IHrmc) in the harmonic-oriented system;
ascertain (440) a DC manipulated variable (UHrmc*) by means of the controller (120) as a function of the control deviation;
back-transform (450) the DC manipulated variable (UHrmc*) by means of the output transformer to form a manipulated variable (UdqHrmc*) in the field-oriented system; superimposing (460) the fundamental DC manipulated variable with the manipulated variable (UdqHrmc*),
wherein, the output value of the superimposition (460) of the fundamental DC manipulated variable with the manipulated variable (UdqHrmc*) is back-transformed to form the machine manipulated variable (Uabc*).

\* \* \* \* \*